United States Patent
Yeh et al.

(10) Patent No.: US 8,898,370 B2
(45) Date of Patent: Nov. 25, 2014

(54) DATA STORAGE METHOD FOR FLASH MEMORY, AND FLASH MEMORY CONTROLLER AND FLASH MEMORY STORAGE SYSTEM USING THE SAME

(75) Inventors: Chih-Kang Yeh, Kinmen County (TW); Yong-Long Su, Taoyuan County (TW)

(73) Assignee: Phison Electronics Corp., Miaoli (TW)

( * ) Notice: Subject to any disclaimer, the term of this patent is extended or adjusted under 35 U.S.C. 154(b) by 825 days.

(21) Appl. No.: 12/649,739

(22) Filed: Dec. 30, 2009

(65) Prior Publication Data

US 2011/0125954 A1    May 26, 2011

(30) Foreign Application Priority Data

Nov. 23, 2009 (TW) ................................ 98139810 A

(51) Int. Cl.
*G06F 12/02* (2006.01)
(52) U.S. Cl.
CPC .... *G06F 12/0246* (2013.01); *G06F 2212/7203* (2013.01); *G06F 2212/7202* (2013.01)
USPC .......................................... 711/103; 711/173
(58) Field of Classification Search
USPC ................................................. 711/103, 173
See application file for complete search history.

(56) References Cited

U.S. PATENT DOCUMENTS

| | | | | |
|---|---|---|---|---|
| 7,136,986 B2 * | 11/2006 | Han et al. | ....................... | 711/203 |
| 2004/0111583 A1 * | 6/2004 | Han et al. | ....................... | 711/203 |
| 2009/0175075 A1 * | 7/2009 | Yeh et al. | .................. | 365/185.03 |
| 2010/0017561 A1 * | 1/2010 | Yang et al. | ..................... | 711/103 |
| 2010/0153624 A1 * | 6/2010 | Kuo | ............... | 711/103 |
| 2011/0153913 A1 * | 6/2011 | Huang et al. | .................. | 711/103 |

FOREIGN PATENT DOCUMENTS

TW    200931412    7/2009

* cited by examiner

*Primary Examiner* — Jared Rutz
(74) *Attorney, Agent, or Firm* — J.C. Patents

(57) ABSTRACT

A data storage method for storing data into a flash memory chip is provided. The flash memory chip has a plurality of physical addresses, and these physical addresses include a plurality of fast physical addresses and a plurality of slow physical addresses. In the data storage method, the usage rate of the physical addresses is monitored. When the usage rate is not larger than a usage rate threshold value, only the fast physical addresses are used for storing the data into the flash memory chip. When the usage rate is larger than the usage rate threshold value, the fast physical addresses and the slow physical addresses are used for storing the data into the flash memory chip. Thereby, the speed of storing data into the flash memory chip is effectively increased.

21 Claims, 12 Drawing Sheets

420

| Index | Physical address |
|---|---|
| LA(0) | PA(0) |
| LA(1) | PA(1) |
| LA(2) | PA(2) |
| ⋮ | ⋮ |
| LA(127) | PA(127) |
| LA(128) | PA(128) |
| LA(129) | PA(129) |
| LA(130) | PA(130) |
| ⋮ | ⋮ |
| LA(L) | PA(L) |

430

| Index | Logical address | Storage status |
|---|---|---|
| PA(0) | LA(0) | Null data |
| PA(1) | LA(1) | Null data |
| PA(2) | LA(2) | Null data |
| ⋮ | ⋮ | ⋮ |
| PA(127) | LA(127) | Null data |
| PA(128) | LA(128) | Null data |
| PA(129) | LA(129) | Null data |
| PA(130) | LA(130) | Null data |
| ⋮ | ⋮ | ⋮ |
| PA(L) | LA(L) | Null data |
| PA(L+1) | NULL | Null data |
| PA(L+2) | NULL | Null data |
| PA(L+3) | NULL | Null data |
| ⋮ | ⋮ | ⋮ |
| PA(K) | NULL | Null data |

| Index | Physical address |
|---|---|
| LA(0) | PA(0) |
| LA(1) | PA(L+1) |
| LA(2) | PA(2) |
| ⋮ | ⋮ |
| LA(127) | PA(127) |
| LA(128) | PA(128) |
| LA(129) | PA(129) |
| LA(130) | PA(130) |
| ⋮ | ⋮ |
| LA(L) | PA(L) |

| Index | Logical address | Storage status |
|---|---|---|
| PA(0) | LA(0) | Null data |
| PA(1) | LA(1) | Null data |
| PA(2) | LA(2) | Null data |
| ⋮ | ⋮ | ⋮ |
| PA(127) | LA(127) | Null data |
| PA(128) | LA(128) | Null data |
| PA(129) | LA(129) | Null data |
| PA(130) | LA(130) | Null data |
| ⋮ | ⋮ | ⋮ |
| PA(L) | LA(L) | Null data |
| PA(L+1) | LA(1) | Valid data |
| PA(L+2) | NULL | Null data |
| PA(L+3) | NULL | Null data |
| ⋮ | ⋮ | ⋮ |
| PA(K) | NULL | Null data |

| Index | Physical address |
|---|---|
| LA(0) | PA(0) |
| LA(1) | PA(L+1) |
| LA(2) | PA(2) |
| ⋮ | ⋮ |
| LA(127) | PA(127) |
| LA(128) | PA(128) |
| LA(129) | PA(L+2) |
| LA(130) | PA(130) |
| ⋮ | ⋮ |
| LA(L) | PA(L) |

430

| Index | Logical address | Storage status |
|---|---|---|
| PA(0) | LA(0) | Null data |
| PA(1) | LA(1) | Null data |
| PA(2) | LA(2) | Null data |
| ⋮ | ⋮ | ⋮ |
| PA(127) | LA(127) | Null data |
| PA(128) | LA(128) | Null data |
| PA(129) | LA(129) | Null data |
| PA(130) | LA(130) | Null data |
| ⋮ | ⋮ | ⋮ |
| PA(L) | LA(L) | Null data |
| PA(L+1) | LA(1) | Valid data |
| PA(L+2) | LA(129) | Valid data |
| PA(L+3) | NULL | Null data |
| ⋮ | ⋮ | ⋮ |
| PA(K) | NULL | Null data |

| Index | Physical address |
|---|---|
| LA(0) | PA(0) |
| LA(1) | PA(L+3) |
| LA(2) | PA(2) |
| ⋮ | ⋮ |
| LA(127) | PA(127) |
| LA(128) | PA(128) |
| LA(129) | PA(L+2) |
| LA(130) | PA(130) |
| ⋮ | ⋮ |
| LA(L) | PA(L) |

430

| Index | Logical address | Storage status |
|---|---|---|
| PA(0) | LA(0) | Null data |
| PA(1) | LA(1) | Null data |
| PA(2) | LA(2) | Null data |
| ⋮ | ⋮ | ⋮ |
| PA(127) | LA(127) | Null data |
| PA(128) | LA(128) | Null data |
| PA(129) | LA(129) | Null data |
| PA(130) | LA(130) | Null data |
| ⋮ | ⋮ | ⋮ |
| PA(L) | LA(L) | Null data |
| PA(L+1) | LA(1) | Invalid data |
| PA(L+2) | LA(129) | Valid data |
| PA(L+3) | LA(1) | Valid data |
| ⋮ | ⋮ | ⋮ |
| PA(K) | NULL | Null data |

DATA STORAGE METHOD FOR FLASH MEMORY, AND FLASH MEMORY CONTROLLER AND FLASH MEMORY STORAGE SYSTEM USING THE SAME

CROSS-REFERENCE TO RELATED APPLICATION

This application claims the priority benefit of Taiwan application serial no. 98139810, filed on Nov. 23, 2009. The entirety of the above-mentioned patent application is hereby incorporated by reference herein and made a part of this specification.

BACKGROUND

1. Technology Field

The present invention generally relates to a data storage method for a flash memory, and more particularly, to a data storage method for storing data by using different physical addresses according to the usage rate of a flash memory, and a flash memory controller and a flash memory storage system using the same.

2. Description of Related Art

Flash memory is one of the most adaptable memories for battery-powered portable electronic products due to its data non-volatility, low power consumption, small volume, and non-mechanical structure. For example, a solid state drive (SSD) is a storage device that uses a NAND flash memory as its storage medium, and which has been broadly used in notebook computers as the main storage device.

Existing NAND flash memories may be categorized into single level cell (SLC) NAND flash memories and multi level cell (MLC) NAND flash memories according to the number of bits stored in each memory cell. To be specific, the memory cells of a SLC NAND flash memory can only be programmed in single phase, and accordingly each memory cell can only store one bit. While the physical blocks in a MLC NAND flash memory are programmed in multiple phases. Taking a 2-level cell NAND flash memory as an example, the physical blocks thereof are programmed in two phases. During the first phase, data is written into lower pages, and the physical characteristic of the lower pages is similar to that of a SLC NAND flash memory. After the first phase is completed, the second phase may be performed to program upper pages, wherein the writing speed of the lower pages is faster than that of the upper pages. Thus, the pages in each physical block are categorized into slow pages (i.e., upper pages) and fast pages (i.e., lower pages).

Similarly, in an 8- or 16-level cell NAND flash memory, each memory cell has more pages and accordingly data is written in more phases. Herein the page having the fastest writing speed is defined as the lower page, while the other pages having slower writing speeds are all defined as upper pages. An upper page may include a plurality of pages having different writing speeds. In addition, in other cases, the upper page may also be defined as the page having the slowest writing speed or the page having the slowest writing speed and some of the pages having faster writing speeds than the slowest writing speed. For example, in a 4-level memory cell, the lower pages are defined as the pages having the fastest and the second fastest writing speeds, while the upper pages are defined as the pages having the slowest and second slowest writing speeds.

Compared to the MLC NAND flash memory, a SLC NAND flash memory has higher access speed. However, the MLC NAND flash memory offers higher storage capacity and lower cost. Thereby, how to increase the access speed of the MLC NAND flash memory so as to improve the efficiency of a flash memory storage device has become one of the major subjects in the industry.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data storage method that can effectively improve the efficiency of a flash memory storage device.

The present invention is directed to a flash memory controller, wherein a data storage method executed by the flash memory controller can effectively improve the efficiency of a flash memory storage device.

The present invention is directed to a flash memory storage system, wherein a data storage method executed by the flash memory storage system can effectively improve the efficiency of a flash memory storage device.

According to an exemplary embodiment of the present invention, a data storage method for storing data into a flash memory chip is provided, wherein the flash memory chip has a plurality of physical addresses, these physical addresses include at least one fast physical address and at least one slow physical address, and the speed of writing data into the fast physical address is faster than that of the slow physical address. The data storage method includes configuring a plurality of logical addresses, wherein each of the logical addresses is mapped to one of the physical addresses. The data storage method also includes monitoring a usage rate of the physical addresses and determining whether the usage rate is larger than a usage rate threshold value. The data storage method further includes storing the data into the flash memory chip by using a fast mode when the usage rate is not larger than the usage rate threshold value, wherein only the fast physical address is used for storing the data in the fast mode.

According to an exemplary embodiment of the present invention, a flash memory controller for storing data into a flash memory chip is provided, wherein the flash memory chip has a plurality of physical addresses, these physical addresses include at least one fast physical address and at least one slow physical address, and the data writing speed of the fast physical address is faster than that of the slow physical address. The flash memory controller includes a microprocessor unit, a flash memory interface unit, a host interface unit, and a memory management unit. The flash memory interface unit is coupled to the microprocessor unit and used for coupling to the flash memory chip. The host interface unit is coupled to the microprocessor unit and used for coupling to a host system. The memory management unit is coupled to the microprocessor unit and which configures a plurality of logical addresses, wherein each of the logical addresses is mapped to one of the physical addresses. The memory management unit monitors a usage rate of the physical addresses and determines whether the usage rate is larger than a usage rate threshold value. If the usage rate is not larger than the usage rate threshold value, the memory management unit stores the data into the flash memory chip by using a fast mode, wherein the memory management unit only uses the fast physical address for storing the data in the fast mode.

According to an exemplary embodiment of the present invention, a flash memory storage system including a flash memory chip, a connector, and a flash memory controller is provided. The flash memory chip has a plurality of physical addresses, these physical addresses include at least one fast physical address and at least one slow physical address, and the data writing speed of the fast physical address is faster than that of the slow physical address. The connector is used for coupling to a host system. The flash memory controller is coupled to the flash memory chip and the connector for configuring a plurality of logical addresses, wherein each of the logical addresses is mapped to one of the physical addresses. The flash memory controller monitors a usage rate of the physical addresses and determines whether the usage rate is larger than a usage rate threshold value. If the usage rate is not larger than the usage rate threshold value, the flash memory controller stores data into the flash memory chip by using a fast mode, wherein the flash memory controller only uses the fast physical address for storing the data in the fast mode.

As described above, in exemplary embodiments of the present invention, whether the fast physical address is used alone or both the fast physical address and the slow physical address are used for storing data is determined according to the usage rate of the physical addresses. Thereby, the efficiency of the flash memory storage device is improved.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 and FIG. 7 respectively illustrate an example of logical address-physical address mapping table and physical address storage status table according to an exemplary embodiment of the present invention.

FIG. 8 and FIG. 9 respectively illustrate another example of logical address-physical address mapping table and physical address storage status table according to an exemplary embodiment of the present invention.

FIG. 10 and FIG. 11 respectively illustrate yet another example of logical address-physical address mapping table and physical address storage status table according to an exemplary embodiment of the present invention.

FIG. 12 and FIG. 13 respectively illustrate still another example of logical address-physical address mapping table and physical address storage status table according to an exemplary embodiment of the present invention.

DESCRIPTION OF THE EMBODIMENTS

Figure 1A:
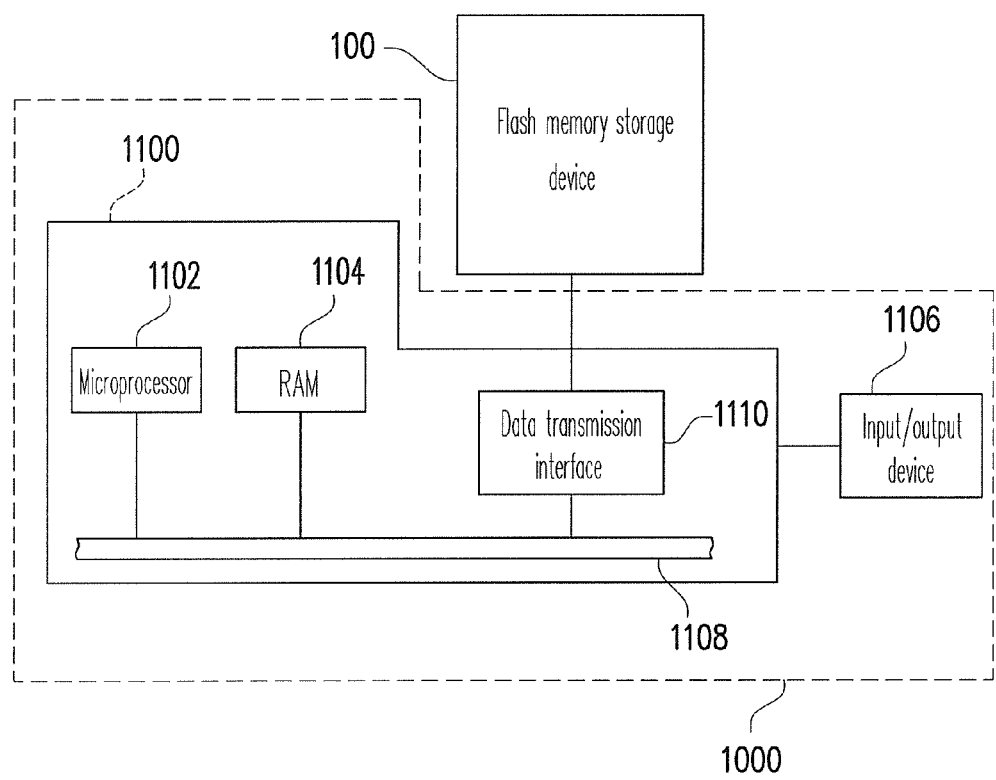
FIG. 1A illustrates a host system using a flash memory storage device according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a flash memory storage device (also referred to as a flash memory storage system) includes a flash memory chip and a controller (also referred to as a control circuit). The flash memory storage device is usually used together with a host system so that the host system can write data into or read data from the flash memory storage device. In addition, a flash memory storage device may also include an embedded flash memory and a software that can be executed in a host system to work as a controller of the embedded flash memory.

FIG. 1A illustrates a host system using a flash memory storage device according to an exemplary embodiment of the present invention.

Figure 1B:
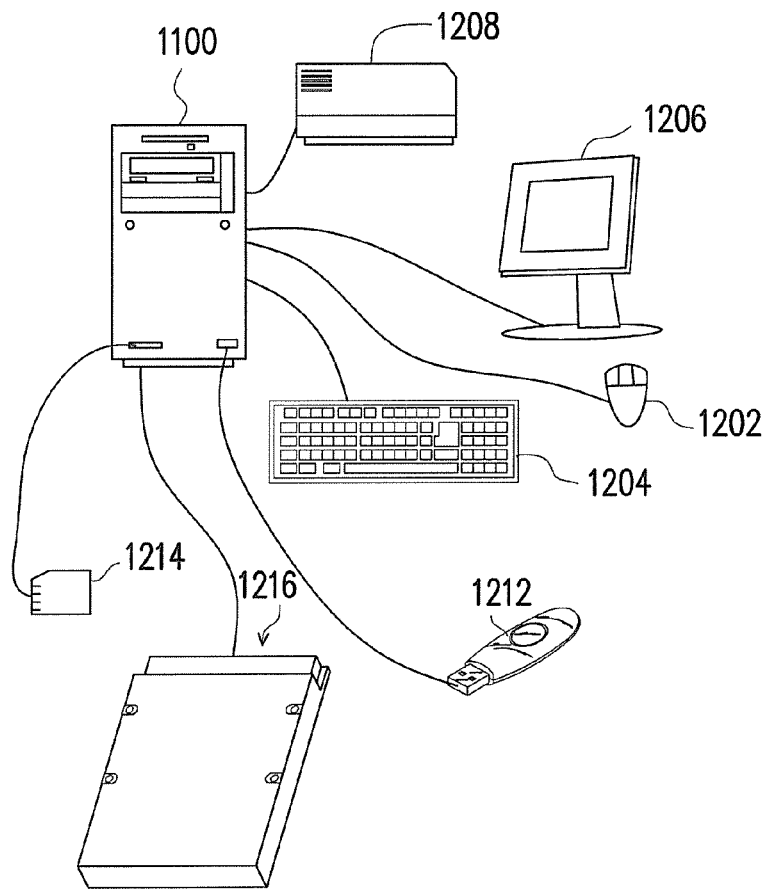
FIG. 1B is a diagram of a computer, an input/output (I/O) device, and a flash memory storage device according to an exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. However, the I/O device 1106 is not limited to the devices illustrated in FIG. 1B and may further include other devices.

In the present embodiment, the flash memory storage device 100 is coupled to other devices of the host system 1000 through the data transmission interface 1110. Through processes of the microprocessor 1102, the RAM 1104, and the I/O device 1106, the host system 1000 can write data into or read data from the flash memory storage device 100. The flash memory storage device 100 may be a flash drive 1212, a memory card 1214, or a solid state drive (SSD) 1216, as shown in FIG. 1B.

Figure 1C:
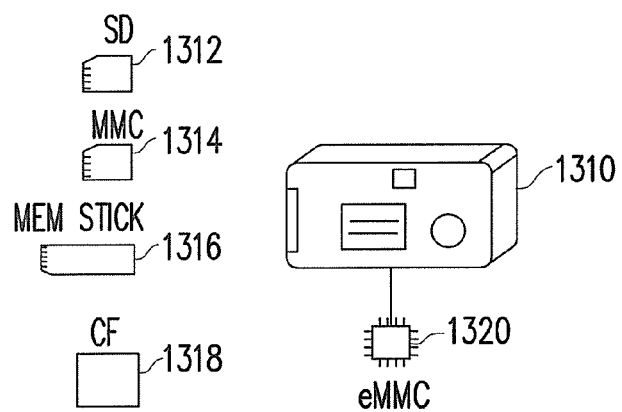
FIG. 1C is a diagram of a host system and a flash memory storage device according to another exemplary embodiment of the present invention.

Generally speaking, the host system 1000 may be any system that can store data. In the present exemplary embodiment, the host system 1000 is a computer system. However, in another exemplary embodiment of the present invention, the host system 1000 may also be a digital camera, a video camera, a communication device, an audio player, or a video player. If the host system is a digital camera 1310, the flash memory storage device is then a SD card 1312, a MMC card 1314, a memory stick 1316, a CF card 1318, or an embedded storage device 1320 (as shown in FIG. 1C) used together with the digital camera 1310. The embedded storage device 1320 includes an embedded MMC (eMMC). It should be mentioned that the eMMC is directly coupled to a substrate of the host system.

Figure 2:
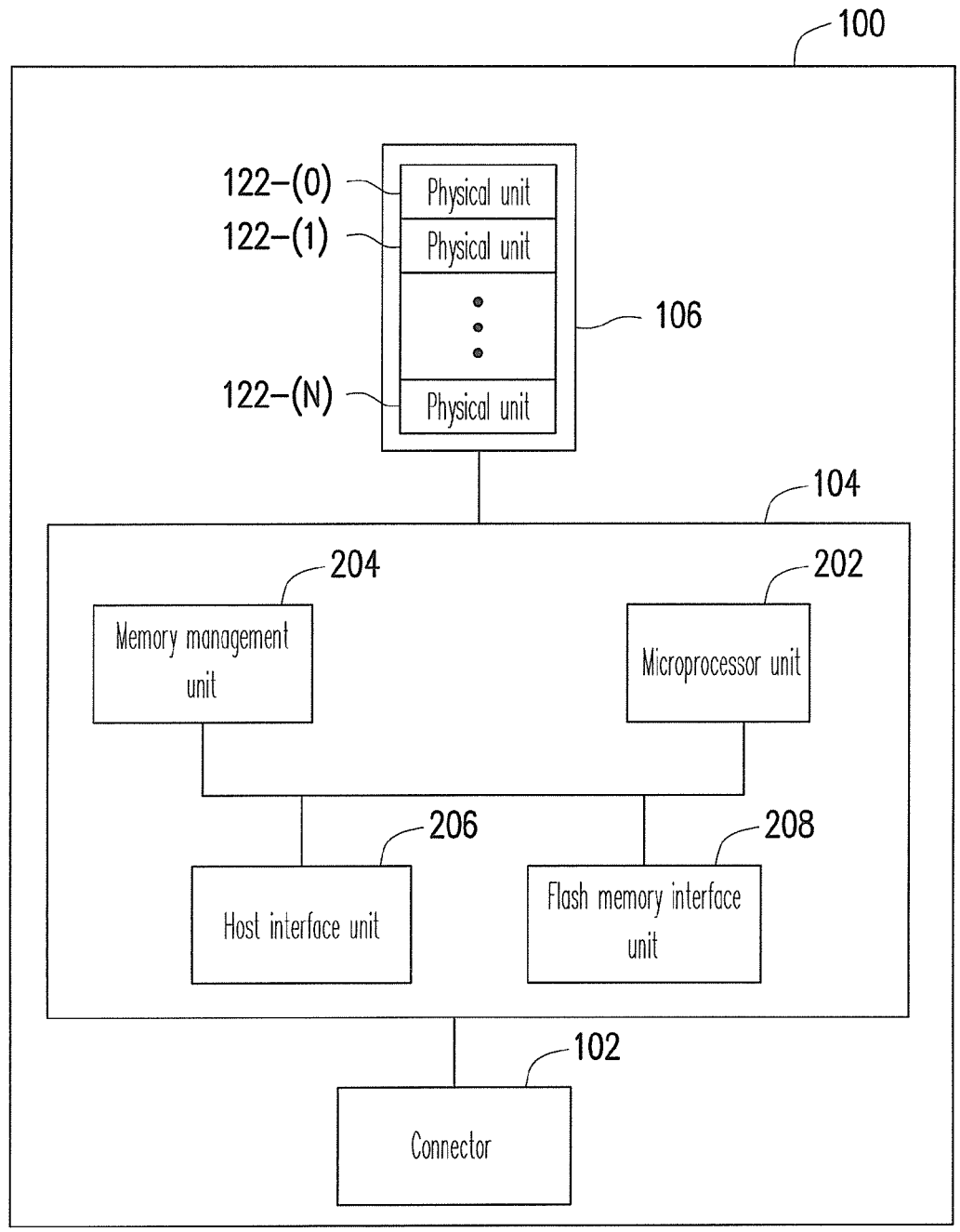
FIG. 2 is a schematic block diagram of the flash memory storage device in FIG. 1A.

FIG. 2 is a schematic block diagram of the flash memory storage device 100 in FIG. 1A.

Referring to FIG. 2, the flash memory storage device 100 includes a connector 102, a flash memory controller 104, and a flash memory chip 106.

The connector 102 is coupled to the flash memory controller 104 and configured for coupling to the host system 1000. In the present exemplary embodiment, the connector 102 is a serial advanced technology attachment (SATA) connector. However, the present invention is not limited thereto, and the connector 102 may also be a universal serial bus (USB) connector, an Institute of Electrical and Electronic Engineers (IEEE) 1394 connector, a peripheral component interconnect (PCI) express connector, a secure digital (SD) interface connector, a memory stick (MS) interface connector, a multi media card (MMC) interface connector, a compact flash (CF) interface connector, an integrated device electronics (IDE) connector, or other suitable connector.

The flash memory controller 104 executes a plurality of logic gates or control instruction implemented in a hardware or firmware form and performs different data operations on the flash memory chip 106 according to instructions of the host system 1000. The flash memory controller 104 includes a microprocessor unit 202, a memory management unit 204, a host interface unit 206, and a flash memory interface unit 208.

The microprocessor unit 202 is the main control unit of the flash memory controller 104, and which cooperates with the memory management unit 204, the host interface unit 206, and the flash memory interface unit 208 to carry out various operations of the flash memory storage device 100.

The memory management unit 204 is coupled to the microprocessor unit 202 and executes a data storage mechanism and a block management mechanism provided by the present exemplary embodiment. Below, the operations of the memory management unit 204 will be described in detail with reference to accompanying drawings.

In the present exemplary embodiment, the memory management unit 204 is implemented in the flash memory controller 104 as a firmware form. For example, the memory management unit 204 including a plurality of control instructions is burned into a program memory (for example, a read only memory (ROM)), and the program memory is embedded into the flash memory controller 104. When the flash memory storage device 100 is in operation, the control instructions of the memory management unit 204 are executed by the microprocessor unit 202 to accomplish the data writing mechanism and the block management mechanism according to embodiments of the present invention.

In another exemplary embodiment of the present invention, the control instructions of the memory management unit 204 may also be stored in a specific area (for example, a system area exclusively configured for storing system data) of the flash memory chip 106 as program codes. Similarly, the control instructions of the memory management unit 204 are executed by the microprocessor unit 202 when the flash memory storage device 100 is in operation. In addition, in yet another exemplary embodiment of the present invention, the memory management unit 204 may also be implemented in the flash memory controller 104 in a hardware form.

The host interface unit 206 is coupled to the microprocessor unit 202 for receiving and identifying commands and data received from the host system 1000. Namely, commands and data received from the host system 1000 are sent to the microprocessor unit 202 through the host interface unit 206. In the present exemplary embodiment, the host interface unit 206 is a SATA interface corresponding to the connector 102. However, the present invention is not limited thereto, and the host interface unit 206 may also be a PATA interface, a USB interface, an IEEE 1394 interface, a PCI express interface, a SD interface, a MS interface, a MMC interface, a CF interface, an IDE interface, or other suitable data transmission interface.

The flash memory interface unit 208 is coupled to the microprocessor unit 202 and configured to access the flash memory chip 106. Namely, data to be written into the flash memory chip 106 is converted by the flash memory interface unit 208 into a format acceptable to the flash memory chip 106.

Figure 3:
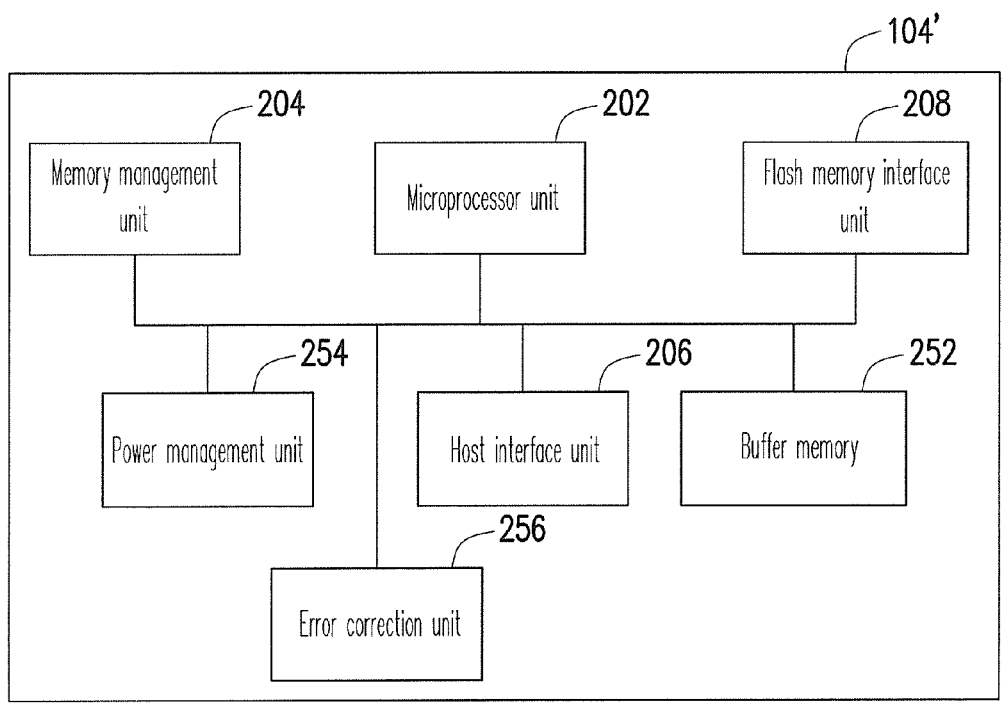
FIG. 3 is a schematic block diagram of a flash memory controller according to another exemplary embodiment of the present invention.

In another exemplary embodiment of the present invention, the flash memory controller may further include other function modules. FIG. 3 is a schematic block diagram of a flash memory controller according to another exemplary embodiment of the present invention.

Referring to FIG. 3, besides, the microprocessor unit 202, the memory management unit 204, the host interface unit 206, and the flash memory interface unit 208, the flash memory controller 104' further includes a buffer memory 252, a power management unit 254, and an error correction unit 256.

The buffer memory 252 is coupled to the microprocessor unit 202 and configured for storing data and commands from the host system 1000 or data from the flash memory chip 106.

The power management unit 254 is coupled to the microprocessor unit 202 and controls the power supply of the flash memory storage device 100.

The error correction unit 256 is coupled to the microprocessor unit 202 and executes an error correction procedure to ensure the accuracy of data. To be specific, when the memory management unit 204 receives a host write command from the host system 1000, the error correction unit 256 generates an error checking and correcting (ECC) code for the data corresponding to the host write command, and the memory management unit 204 writes the data and the corresponding ECC code into the flash memory chip 106. When subsequently the memory management unit 204 reads the data from the flash memory chip 106, the memory management unit 204 simultaneously reads the corresponding ECC code, and the error correction unit 256 executes the error correction procedure on the data according to the ECC code.

Referring to FIG. 2 again, the flash memory chip 106 is coupled to the flash memory controller 104 and configured for storing data. The flash memory chip 106 has physical units 122-(0)-122-(N). In the present exemplary embodiment, each physical unit is composed of a plurality of physical blocks. However, the present invention is not limited thereto, and each physical unit may also be composed of only one physical block. Each physical block is the smallest erasing unit. Namely, each physical block contains the least number of memory cells that are erased together. Each physical block has a plurality of physical addresses. In the present exemplary embodiment, the physical addresses are physical pages. However, the present invention is not limited thereto. Each physical page is the smallest programming unit. In other words, each physical page is the smallest unit for writing or reading data. Each physical page usually includes a user data area and a redundant area, wherein the user data area is used for storing user data, and the redundant area is used for storing system data (for example, an ECC code). In the present exemplary embodiment, the flash memory chip 106 is a MLC flash memory chip.

Figure 4:
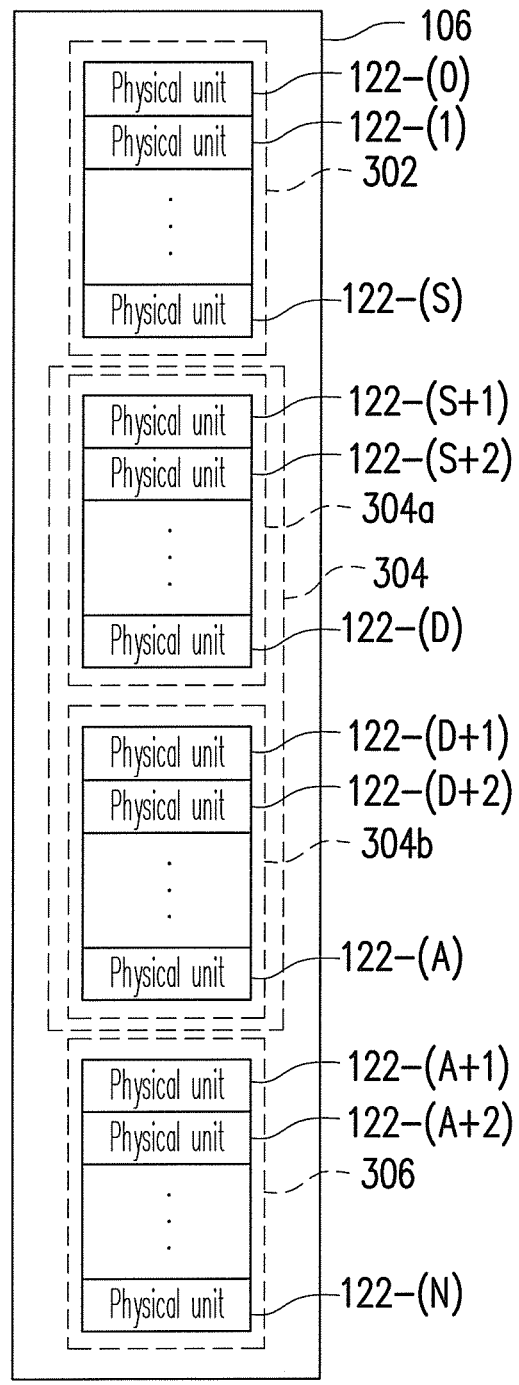
FIG. 4 is a block diagram of a flash memory chip according to an exemplary embodiment of the present invention.

FIG. 4 is a block diagram of a flash memory chip according to an exemplary embodiment of the present invention. It should be understood that the terms used herein for describing the operations (for example, "get", "select", "replace", "group", and "alternate", etc) performed on the physical blocks of a flash memory refer to logical operations performed on these physical blocks. Namely, the physical blocks in the flash memory are only logically operated and the actual positions thereof are not changed.

Referring to FIG. 4, the memory management unit 204 logically groups the physical units 122-(0)-122-(N) into a system area 302, a storage area 304, and a replacement area 306.

The physical units 122-(0)-122-(S) logically belonging to the system area 302 are used for recording system data, such as the manufacturer and model of the flash memory chip, the number of zones in each flash memory chip, the number of physical units in each zone, and the number of physical pages in each physical unit.

The physical units 122-(S+1)-122-(A) logically belonging to the storage area 304 are used for storing data written by the host system 1000. Namely, the flash memory storage device 100 uses the physical units in the storage area 304 for actually storing data written by the host system 1000. To be specific, the physical units 122-(S+1)-122-(A) in the storage area 304 are further grouped into a data area 304a and a spare area 304b, wherein the physical units 122-(S+1)-122-(D) in the data area 304a are physical units full of data, and the physical units 122-(D+1)-122-(A) in the spare area 304b are physical units containing no data. To be more specific, when the memory management unit 204 gets a physical unit from the spare area 304b and writes data into the gotten physical unit, the gotten physical unit is associated to the data area 304a, and after a physical unit associated to the data area 304a is erased, the erased physical unit is associated to the spare area 304b.

The physical units 122-(A+1)-122-(N) logically belonging to the replacement area 306 are replacement physical units. For example, when the flash memory chip 106 is manufactured, 4% of its physical blocks are reserved for replacement purpose. Namely, when the physical blocks in the physical units of the system area 302 and the storage area 304 are damaged, the physical blocks in the physical units reserved in the replacement area 306 can be used for replacing the damaged physical blocks (i.e., bad blocks). Thus, if there are still available physical blocks in the replacement area 306 and a physical block is damaged, the memory management unit 204 gets a normal physical block from the replacement area 306 for replacing the damaged physical block. If there is no more no mal physical block in the replacement area 306 and a physical block is damaged, the flash memory storage device 100 is announced as being in a write-protected status and cannot be used for writing data anymore.

It should be understood that how the physical units 122-(0)-122-(N) are grouped into the system area 302, the data area 304a, the spare area 304b, and the replacement area 306 dynamically changes during the operation of the flash memory storage device 100. Namely, after the memory management unit 204 writes data into a physical unit originally belonging to the spare area 304b (for example, the physical unit 122-(D+2)), the physical unit is associated to the data area 304a. Or, when a physical unit in the data area 304a (or the spare area 304b) is damaged and accordingly replaced by a physical block gotten from the replacement area 306, the physical unit originally in the replacement area 306 is associated to the data area 304a (or the spare area 304b).

Figure 5:
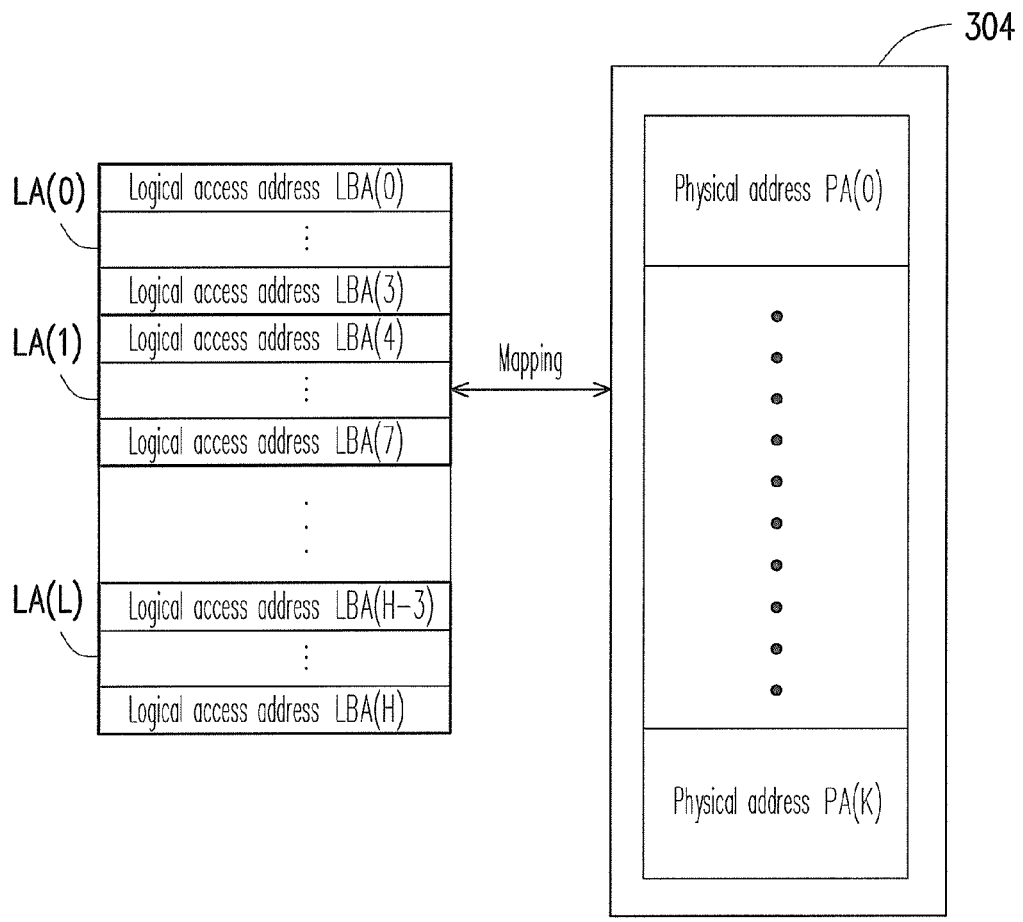
FIG. 5 is a diagram illustrating the mapping relationships between logical addresses and physical addresses according to an exemplary embodiment of the present invention.

FIG. 5 is a diagram illustrating the mapping relationships between logical addresses and physical addresses according to an exemplary embodiment of the present invention.

Referring to FIG. 5, because the flash memory storage device 100 alternatively uses the physical units in the storage area 304 for storing data written by the host system 1000, the memory management unit 204 provides logical access addresses LBA(0)-LBA(H) to the host system 1000 to allow the host system 1000 to access the data.

Herein the logical access addresses may be sectors or clusters. Particularly, in the present exemplary embodiment, the memory management unit 204 groups the logical access addresses LBA(0)-LBA(H) into logical addresses LA(0)-LA(L) and maps the logical addresses LA(0)-LA(L) to the physical addresses PA(0)-PA(K) of the physical blocks in the storage area 304, wherein each of the logical addresses is mapped to one of the physical addresses. For example, the memory management unit 204 determines the logical address mapped to each logical access address based on a mathematics formula.

In the present exemplary embodiment, each logical address is composed of 4 logical access addresses. For example, the logical access addresses LBA(0)-LBA(3) belong to the logical address LA(0), the logical access addresses LBA(4)-LBA(7) belong to the logical address LA(1), the logical access addresses LBA(8)-LBA(11) belong to the logical address LA(2), and so on. In the present exemplary embodiment, the logical addresses are logical pages. Namely, each logical address contains 4 logical access addresses. However, the present invention is not limited thereto, and in another exemplary embodiment of the present invention, each logical address may also be composed of 8 or 16 logical access addresses.

In addition, the memory management unit 204 maintains a logical address-physical address mapping table and a physical address storage status table for recording the mapping relationships between the logical addresses and the physical addresses. Namely, when the host system 1000 is about to access data in a logical access address, the memory management unit 204 determines the logical address corresponding to the logical access address and accesses the data from the physical address mapped to the logical address.

To be specific, when the memory management unit 204 uses the physical unit 122-(D+1) for storing data to be written by the host system 1000, the memory management unit 204 writes the data sequentially into the physical addresses of the physical unit 122-(D+1) regardless of which logical address the host system 1000 writes the data into, and when the memory management unit 204 uses the physical unit 122-(D+2) for storing data to be written by the host system 1000, the memory management unit 204 writes the data sequentially into the physical addresses of the physical unit 122-(D+2) regardless of which logical address the host system 1000 writes data into. Namely, while writing data from the host system 1000, the memory management unit 204 sequentially uses the physical addresses in one physical unit for writing the data. When all the physical addresses in the physical unit have stored data, the memory management unit 204 gets another physical unit containing no data (i.e., a physical unit selected from the spare area 304b) and continues to write the data into the physical addresses of the newly gotten physical unit. In the present exemplary embodiment, after data is written into a physical address, the memory management unit 204 updates the logical address-physical address mapping table and the physical address storage status table to record the mapping relationships between the logical addresses and the physical addresses correctly.

It should be mentioned that in an exemplary embodiment of the present invention, the memory management unit 204 further includes an available physical address pointer for indicating the currently available physical address. Thus, when the flash memory controller 104 executes a host write command received from the host system 1000 to write data, the memory management unit 204 sequentially writes the data into the physical addresses of the flash memory chip 106 according to the indication of the available physical address pointer.

Additionally, in the present exemplary embodiment, the memory management unit 204 records the storage status of each physical address in the physical address storage status table. For example, when the memory management unit 204 writes data from the host system 1000 into a physical address and updates the logical address-physical address mapping table and the physical address storage status table, the memory management unit 204 marks the storage status of the physical address newly mapped to the logical address into which the data is written as "valid data" in the physical address storage status table. Meanwhile, if the storage status of the physical address originally mapped to the logical address is "valid data", the memory management unit 204 marks the storage status of the physical address originally mapped to the logical address as "invalid data". Moreover, the storage statuses of those physical addresses containing no data are marked as "null data" in the physical address storage status table, wherein the physical addresses containing no data refer to those physical addresses which are never used for storing data or data stored therein is already erased. The details of maintaining the logical address-physical address mapping table and the physical address storage status table will be explained in detail with reference to several examples.

FIG. 6 and FIG. 7 respectively illustrate an example of logical address-physical address mapping table and physical address storage status table according to an exemplary embodiment of the present invention. In the present exemplary embodiment, the logical address-physical address mapping table 420 has an index field and a physical address field for recording the physical address mapped to each logical address, and the physical address storage status table 430 has an index field, a logical address field, and a storage status field for recording the logical address mapped to each physical address and the storage status of the physical address.

Referring to FIG. 6 and FIG. 7, in this example, it is assumed that the flash memory storage device 100 is brand new and never used for storing data. For example, in the logical address-physical address mapping table 420, the logical addresses LA(0)-LA(L) are respectively mapped to the physical addresses PA(0)-PA(L). In the physical address storage status table 430, the physical addresses PA(0)-PA(L) are mapped to the logical addresses LA(0)-LA(L), the mapping relationships of the physical addresses PA(L+1)-PA(K) are left blank (for example, "NULL"), and the storage statuses of the physical addresses PA(0)-PA(L) are marked as "null data". In addition, the available physical address pointer points to the physical address PA(L+1).

FIG. 8 and FIG. 9 respectively illustrate another example of logical address-physical address mapping table and physical address storage status table according to an exemplary embodiment of the present invention.

Referring to FIG. 8 and FIG. 9, under the status illustrated in FIG. 6 and FIG. 7, if the host system 1000 is about to write data into the flash memory storage device 100 and the data belongs to the logical address LA(1), the memory management unit 204 writes the data into the physical address PA(L+1) according to the available physical address pointer and points the available physical address pointer to the physical address PA(L+2). Then, the memory management unit 204 maps the logical address LA(1) to the physical address PA(L+1) in the logical address-physical address mapping table 420. In addition, the memory management unit 204 maps the physical address PA(L+1) to the logical address LA(1) and changes the storage status of the physical address PA(L+1) into "valid data" in the physical address storage status table 430. Because the storage status of the physical address PA(1) originally mapped to the logical address LA(1) is marked as "null data", the storage status of the physical address PA(1) remains unchanged.

FIG. 10 and FIG. 11 respectively illustrate yet another example of logical address-physical address mapping table and physical address storage status table according to an exemplary embodiment of the present invention.

Referring to FIG. 10 and FIG. 11, under the status illustrated in FIG. 8 and FIG. 9, if the host system 1000 is about to write data into the flash memory storage device 100 and the data belongs to the logical address LA(129), the memory management unit 204 writes the data into the physical address PA(L+2) according to the available physical address pointer and points the available physical address pointer to the physical address PA(L+3). Then, the memory management unit 204 maps the logical address LA(129) to the physical address PA(L+2) in the logical address-physical address mapping table 420. In addition, the memory management unit 204 maps the physical address PA(L+2) to the logical address LA(129) and changes the storage status of the physical address PA(L+2) into "valid data" in the physical address storage status table 430. Because the storage status of the physical address PA(129) originally mapped to the logical address LA(129) is marked as "null data", the storage status of the physical address PA(129) remains unchanged.

FIG. 12 and FIG. 13 respectively illustrate still another example of logical address-physical address mapping table and physical address storage status table according to an exemplary embodiment of the present invention.

Referring to FIG. 12 and FIG. 13, under the status illustrated in FIG. 10 and FIG. 11, if the host system 1000 is about to write data into the flash memory storage device 100 and the data belongs to the logical address LA(1), the memory management unit 204 writes the data into the physical address PA(L+3) according to the available physical address pointer and points the available physical address pointer to the physical address PA(L+4). Then, the memory management unit 204 maps the logical address LA(1) to the physical address PA(L+3) in the logical address-physical address mapping table 420. In addition, the memory management unit 204 maps the physical address PA(L+3) to the logical address LA(1) and changes the storage status of the physical address PA(L+3) into "valid data" in the physical address storage status table 430. Because the storage status of the physical address PA(L+1) originally mapped to the logical address LA(1) is marked as "valid data", the memory management unit 204 changes the storage status of the physical address PA(L+1) into "invalid data". Particularly, when subsequently the memory management unit 204 erases those physical addresses whose the storage status are marked as invalid data, the storage statuses of these physical addresses are changed into "null data".

It should be mentioned that in the file management mechanism of the operating system (OS) of the host system 1000, the OS manages data stored in a storage device through a file allocation table (FAT). In particular, when the OS deletes data, the OS simply marks the data in the logical addresses to be deleted as invalid value in the FAT but does not actually delete the data. Subsequently, when the OS is about to write data into these logical addresses, the OS directly writes the data into these logical addresses. In the present exemplary embodiment, the memory management unit 204 receives a deletion record from the host system 1000, wherein the deletion record carries information about that the data in which logical addresses has been deleted. Herein, a logical address whose data has been deleted by the OS of the host system 1000 is referred to as a deleted logical address. In particular, the memory management unit 204 marks the storage status of the physical address mapped to the deleted logical address as "invalid data" in the physical address storage status table 430 according to the deletion record.

In the present exemplary embodiment, the OS of the host system 1000 is Microsoft Windows 7, wherein the Microsoft Windows 7 sends a deletion record through a trim command, and the host interface unit 206 and the memory management unit 204 can support and identify the trim command. However, the present invention is not limited thereto, and command that can transmit the deletion record can be applied in the present invention.

In the present exemplary embodiment, the flash memory chip 106 is a 2-level cell flash memory chip, and the physical addresses PA(0)-PA(K) of the physical units 122-(0)-122-(N) are categorized into fast physical addresses (i.e., fast pages) and slow physical addresses (i.e., slow pages) according to the access speeds thereof. For example, the physical addresses PA(0), PA(2), PA(4) . . . , and PA(K−1) are fast physical addresses, and the physical addresses PA(1), PA(3), PA(5) . . . , and PA(K) are slow physical addresses, wherein K is an odd integer. However, in another exemplary embodiment of the present invention, the flash memory chip 106 may also be a 3-level cell flash memory chip, a 4-level cell flash memory chip, or other types of MLC flash memory chip. In particular, the memory management unit 204 monitors the usage rate of the physical addresses and determines whether to use a fast mode or a regular mode to store data into the flash memory chip 106 according to the monitored usage rate. In particular, in the fast mode, the memory management unit 204 only uses the fast physical addresses for storing the data to be written by the host system 1000. And, in the regular mode the memory management unit 204 uses the fast physical addresses and the slow physical addresses for storing the data to be written by the host system 1000. Namely, in the regular mode, the fast physical addresses and the slow physical addresses of the flash memory chip 106 are all provided for storing data, and in the fast mode, only the fast physical addresses are provided for storing data. Thus, the data writing speed in the fast mode is higher than that in the regular mode.

To be specific, the memory management unit 204 calculates a ratio of those physical addresses whose the storage status are marked as "valid data" to all the physical addresses as the usage rate in the physical address storage status table 430. When the usage rate is larger than a usage rate threshold value, the memory management unit 204 stores data in the regular mode, and when the usage rate is not larger than the usage rate threshold value, the memory management unit 204 stores data in the fast mode. Herein the usage rate threshold value is set to 50%. However, the present invention is not limited thereto.

Figure 14:
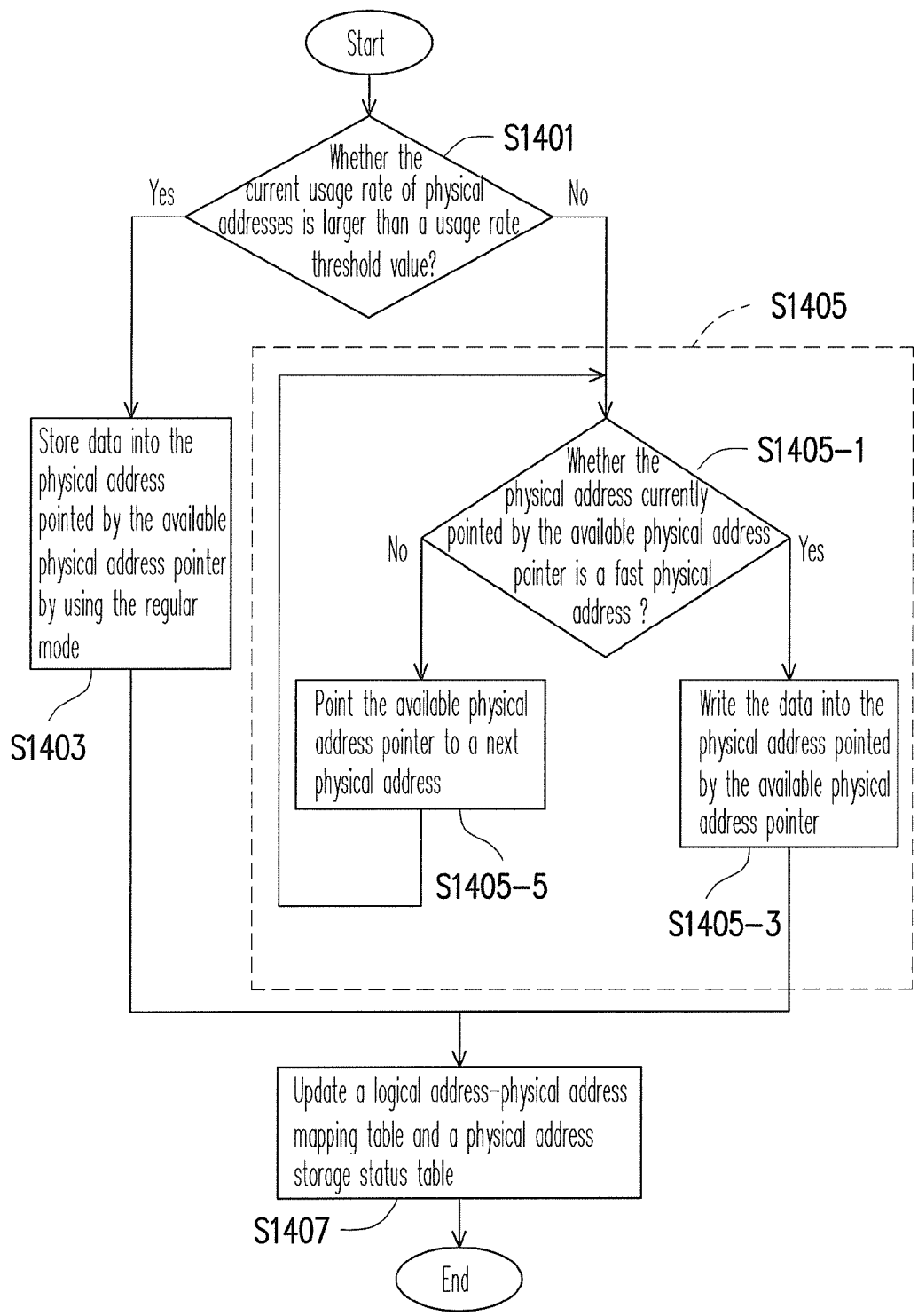
FIG. 14 is a flowchart of a data storage method according to an exemplary embodiment of the present invention.

FIG. 14 is a flowchart of a data storage method according to an exemplary embodiment of the present invention.

Referring to FIG. 14, when the flash memory storage device 100 receives a host write command and data to be written from the host system 1000, in step S1401, the memory management unit 204 determines whether the current usage rate of the physical addresses is larger than the usage rate threshold value.

If the usage rate of the physical addresses is larger than the usage rate threshold value, in step S1403, the memory management unit 204 stores the data into the physical address pointed by the available physical address pointer by using the regular mode. Namely, the memory management unit 204 writs the data into the physical address pointed by the available physical address pointer regardless of whether the physical address pointed by the available physical address pointer is a fast physical address or a slow physical address.

If the usage rate of the current physical address is not larger than the usage rate threshold value, in step S1405, the memory management unit 204 stores the data into the physical address pointed by the available physical address pointer by using the fast mode. To be specific, in step S1405-1, the memory management unit 204 determines whether the physical address currently pointed by the available physical address pointer is a fast physical address. If the physical address pointed by the available physical address pointer is a fast physical address, in step S1405-3, the memory management unit 204 writes the data into the physical address pointed by the available physical address pointer. If the physical address pointed by the available physical address pointer is not a fast physical address, in step S1405-5, the memory management unit 204 points the available physical address pointer to the next physical address, and step S1405-1 is executed again. For example, in an exemplary embodiment of the present invention, the memory management unit 204 determines whether each physical address is a fast physical address according to a physical address lookup table or a mathematics expression.

Thereafter, in step S1407, the memory management unit 204 updates the logical address-physical address mapping table 420 and the physical address storage status table 430. The details of updating the logical address-physical address mapping table 420 and the physical address storage status table 430 has been described above with reference to FIGS. 6-13 therefore will not be described herein.

Figure 15:
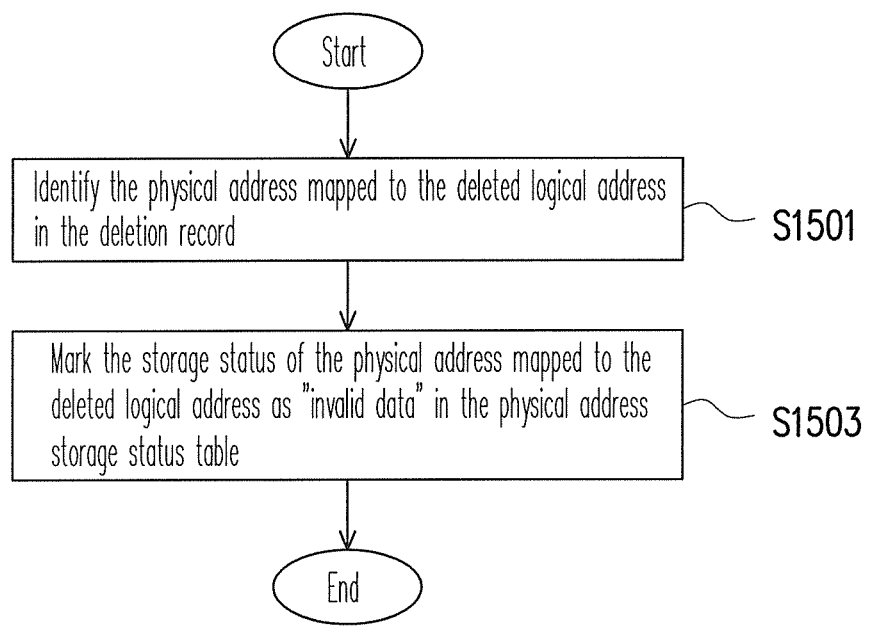
FIG. 15 is another flowchart of the data storage method according to an exemplary embodiment of the present invention.

FIG. 15 is another flowchart of the data storage method according to an exemplary embodiment of the present invention. The steps of updating the physical address storage status table 430 when the flash memory storage device 100 receives a deletion record from the host system 1000 are illustrated in FIG. 15.

Referring to FIG. 15, in step S1501, the memory management unit 204 identifies the physical address mapped to the deleted logical address in the deletion record. Then, in step S1503, the memory management unit 204 marks the storage status of the physical address mapped to the deleted logical address as "invalid data" in the physical address storage status table 430.

As described above, in the data storage method disclosed in exemplary embodiments of the present invention, data is stored into a flash memory by using a fast mode or a regular mode according to the usage rate of physical addresses in the flash memory, wherein the speed of writing data into a flash memory storage device is effectively increased in the fast mode. In addition, in the data storage method disclosed in exemplary embodiments of the present invention, the validity of data stored in each physical address is monitored by using a physical address storage status table, so that invalid data is moved less times and accordingly the efficiency of a flash memory storage device is improved. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data storage method, for storing data into a flash memory chip, wherein the flash memory chip has a plurality of physical blocks and each of the physical block has a plurality of physical addresses, the physical addresses comprise at least one fast physical address and at least one slow physical address, and a speed of writing data into the at least one fast physical address is faster than a speed of writing data into the at least one slow physical address, the data storage method comprising:
    configuring a plurality of logical addresses, wherein each of the logical addresses is mapped to one of the physical addresses;
    calculating a ratio of the physical addresses containing valid data to all the physical addresses of at least two of the physical blocks and serving the ratio as a usage rate of the physical addresses of at least two of the physical blocks;
    determining whether the usage rate of the physical addresses of at least two of the physical blocks is larger than a usage rate threshold value; and
    storing the data into the flash memory chip by using a fast mode when the usage rate is not larger than the usage rate threshold value,
    wherein only the at least one fast physical address is used to store the data in the fast mode.

2. The data storage method according to claim 1 further comprising:
    storing the data into the flash memory chip by using a regular mode when the usage rate of the physical addresses of at least two of the physical blocks is larger than the usage rate threshold value, wherein the at least one fast physical address and the at least one slow physical address are used to store the data in the regular mode.

3. The data storage method according to claim 1, wherein the usage rate threshold value is 50%.

4. The data storage method according to claim 1, wherein the step of monitoring the usage rate of the physical addresses of at least two of the physical blocks comprises:
    establishing a physical address storage status table to record statuses of the physical addresses;
    when a host system writes data into a logical address among the logical addresses, marking the status of the physical addresses newly mapped to the logical address as valid data and marking the status of the physical addresses originally mapped to the logical address as invalid data or null data in the physical address storage status table; and
    calculating the usage rate of the physical addresses according to the physical address storage status table.

5. The data storage method according to claim 4, wherein the step of monitoring the usage rate of the physical addresses of at least two of the physical blocks further comprises:
    identifying at least one deleted logical address among the logical addresses; and
    marking the status of the physical address mapped to the at least one deleted logical address as invalid data in the physical address storage status table.

6. The data storage method according to claim 5, wherein the step of identifying the at least one deleted logical address among the logical addresses comprises:
    obtaining at least one deletion record from the host system, wherein the deletion record comprises information related to the at least one deleted logical address.

7. The data storage method according to claim 6, wherein the step of obtaining the at least one deletion record from the host system comprises:
    receiving at least one trim command from the host system; and
    identifying the at least one trim command to obtain the at least one deletion record.

8. A flash memory controller, for storing data into a flash memory chip, wherein the flash memory chip has a plurality of physical blocks and each of the physical block has a plurality of physical addresses, the physical addresses comprise at least one fast physical address and at least one slow physical address, and a speed of writing data into the at least one fast physical address is faster than a speed of writing data into the at least one slow physical address, the flash memory controller comprising:
    a microprocessor unit;
    a flash memory interface unit, coupled to the microprocessor unit, and configured to couple to the flash memory chip;
    a host interface unit, coupled to the microprocessor unit, and configured to couple to a host system; and
    a memory management unit, coupled to the microprocessor unit,
    wherein the memory management unit configures a plurality of logical addresses, wherein each of the logical addresses is mapped to one of the physical addresses,
    wherein the memory management unit monitors a usage rate of the physical addresses of at least two of the physical blocks and determines whether the usage rate of the physical addresses of at least two of the physical blocks is larger than a usage rate threshold value, wherein the usage rate is calculated based on a ratio of the physical addresses containing valid data to all the physical addresses of at least two of the physical blocks,
    wherein the memory management unit stores the data into the flash memory chip by using a fast mode when the usage rate of the physical addresses of at least two of the physical blocks is not larger than the usage rate threshold value, wherein the memory management unit only uses the at least one fast physical address to store the data in the fast mode.

9. The flash memory controller according to claim 8, wherein the memory management unit stores the data into the flash memory chip by using a regular mode when the usage rate of the physical addresses of at least two of the physical blocks is larger than the usage rate threshold value, wherein the memory management unit uses the at least one fast physical address and the at least one slow physical address to store the data in the regular mode.

10. The flash memory controller according to claim 8, wherein the usage rate threshold value is 50%.

11. The flash memory controller according to claim 8,
wherein the memory management unit establishes a physical address storage status table to record statuses of the physical addresses,
wherein when the host system writes data into a logical address among the logical addresses, the memory management unit marks the status of the physical address newly mapped to the logical address as valid data and marks the status of the physical address originally mapped to the logical address as invalid data or null data in the physical address storage status table,
wherein the memory management unit calculates the usage rate of the physical addresses of at least two of the physical blocks according to the physical address storage status table.

12. The flash memory controller according to claim 11, wherein the memory management unit identifies at least one deleted logical address among the logical addresses and marks the status of the physical address mapped to the at least one deleted logical address as invalid data in the physical address storage status table.

13. The flash memory controller according to claim 12, wherein the memory management unit obtains at least one deletion record from the host system through the host interface unit, wherein the deletion record comprises information related to the at least one deleted logical address.

14. The flash memory controller according to claim 13, wherein the host interface unit receives at least one trim command from the host system, and the memory management unit identifies the at least one trim command to obtain the at least one deletion record.

15. A flash memory storage system, comprising:
a flash memory chip, having a plurality of physical blocks and each of the physical block has a plurality of physical addresses, wherein the physical addresses comprise at least one fast physical address and at least one slow physical address, and a speed of writing data into the at least one fast physical address is faster than a speed of writing data into the at least one slow physical address;
a connector, configured to couple to a host system; and
a flash memory controller, coupled to the flash memory chip and the connector,
wherein the flash memory controller configures a plurality of logical addresses, wherein each of the logical addresses is mapped to one of the physical addresses,
wherein the flash memory controller monitors a usage rate of the physical addresses of at least two of the physical blocks and determines whether the usage rate is larger than a usage rate threshold value, wherein the usage rate is calculated based on a ratio of the physical addresses containing valid data to all the physical addresses of at least two of the physical blocks,
wherein the flash memory controller stores data into the flash memory chip by using a fast mode when the usage rate of the physical addresses of at least two of the physical blocks is not larger than the usage rate threshold value, wherein the flash memory controller only uses the at least one fast physical address to store the data in the fast mode.

16. The flash memory storage system according to claim 15, wherein the flash memory controller stores the data into the flash memory chip by using a regular mode when the usage rate of the physical addresses of at least two of the physical blocks is larger than the usage rate threshold value, wherein the flash memory controller uses the at least one fast physical address and the at least one slow physical address to store the data in the regular mode.

17. The flash memory storage system according to claim 15, wherein the usage rate threshold value is 50%.

18. The flash memory storage system according to claim 15,
wherein the flash memory controller establishes a physical address storage status table to record statuses of the physical addresses,
wherein when the host system writes data into a logical address among the logical addresses, the flash memory controller marks the status of the physical address newly mapped to the logical address as valid data and marks the status of the physical address originally mapped to the logical address as invalid data or null data in the physical address storage status table,
wherein the flash memory controller calculates the usage rate of the physical addresses of at least two of the physical blocks according to the physical address storage status table.

19. The flash memory storage system according to claim 18, wherein the flash memory controller identifies at least one deleted logical address among the logical addresses and marks the status of the physical address mapped to the at least one deleted logical address as invalid data in the physical address storage status table.

20. The flash memory storage system according to claim 19, wherein the flash memory controller obtains at least one deletion record from the host system through the connector, wherein the at least one deletion record comprises information related to the at least one deleted logical address.

21. The flash memory storage system according to claim 20, wherein the flash memory controller receives at least one trim command from the host system, and the flash memory controller identifies the at least one trim command to obtain the at least one deletion record.

* * * * *